2,923,748

Patented Feb. 2, 1960

2,923,748

IMPROVED PROCESS FOR THE PREPARATION OF 2-CHLOROBUTADIENE-1,3

Martin Broadbooks and Clarence Eugene Painter, Louisville, Ky., assignors to E. I. du Pont de Nemours and Company, Wilmington, Del., a corporation of Delaware No Drawing. Application March 28, 1957
Serial No. 649,007

4 Claims. (Cl. 260—655)

This invention is directed to reactions in contact with liquid phase catalysts and more particularly to the reaction of monovinylacetylene with hydrogen chloride, in the presence of a liquid cuprous chloride catalyst of new type, to produce chloroprene.

Chloroprene (2-chlorobutadiene-1,3) is usually made by the reaction of hydrogen chloride with monovinylacetylene in an excess of monovinylacetylene in the presence of an aqueous solution of cuprous chloride in hydrochloric acid. See U.S. Patents 1,950,431 and 1,950,434. When the reaction is carried out continuously, conditions are arranged so that the excess of monovinylacetylene sweeps the chloroprene vapor out of the catalyst solution, reducing but not eliminating the further reaction of the chloroprene with hydrogen chloride to form 1,3-dichlorobutene-2. The formation of this by-product may be further reduced by reducing the proportion of hydrogen chloride added or by increasing the rate at which the monovinylacetylene is passed through the catalyst. As pointed out in 1,950,434, reducing the hydrogen chloride concentration reduces the speed of reaction. Increasing the rate of flow makes necessary the recovery of more monovinylacetylene.

It has now been found, according to the present novel process, that the formation of 1,3-dichlorobutene-2 may be greatly reduced; this, and other advantages result by carrying out the process of the present invention.

It is an object of the present invention to make 2-chlorobutadiene-1,3 in an unexpected high yield from monovinylacetylene in hydrogen chloride.

It is a further object of the present invention to prepare 2-chlorobutadiene-1,3 in such a manner as to significantly reduce the formation of 1,3-dichlorobutene-2.

These and other objects will become apparent in the following description and claims.

More specifically, the present invention is directed to a process of making 2-chlorobutadiene-1,3 by passing monovinylacetylene and hydrogen chloride through an aqueous catalyst solution containing cuprous chloride wherein about 5 to about 40% (by volume, based on the total volume of the catalyst) of a liquid hydrocarbon or chlorohydrocarbon is dispersed with said catalyst solution.

The aqueous phase of the catalyst of the present invention contains 16 to 27% and preferably 17 to 24% of cuprous chloride, 13 to 21% of hydrogen chloride, and 0 to 10% of potassium chloride or other alkali metal or ammonium chloride. The preferred catalyst contains about 23% cuprous chloride, 17% hydrogen chloride, and 3% potassium chloride.

The hydrocarbon or chlorohydrocarbon may be either aliphatic, cycloaliphatic, or aromatic but preferably should contain no ethylenic or acetylene unsaturation, except to the extent that monovinylacetylene is dissolved therein. Preferably also it should be non-volatile or only slightly volatile at operating temperatures and hence should have a boiling point of at least 100° C. and should not be viscous. Suitable hydrocarbons are kerosenes and fuel oils from paraffinic, naphthenic or aromatic petroleums, white oils, solvent naphthas, and chemical individuals such as toluene, cymene, mesitylene, decahydronaphthalene and cetane. Examples of these chlorinated hydrocarbons are cetyl chloride, monochlorobenzene, ortho-dichlorobenzene, chlorocyclohexane and chloronaphthalene.

Kerosene, xylene, decahydronaphthalene, orthodichlorobenzene and fuel oils containing about 50% aromatics are the preferred hydrocarbons.

The ratio of aqueous to hydrocarbon phase should be such that the hydrocarbon or chlorinated hydrocarbon is between 5 and 40% of the total catalyst, by volume. From 8 to 12% is usually preferred.

Suitable types of non-ionic dispersing agents are the polyethylene oxides terminated with phenols, alcohols, mercaptans; polyesters of glycols and dibasic acids; esters with polyhydroxy compounds of fatty acids; and, complex compounds combining these features. Specific examples of such dispersing agents, in addition to those used in Examples 1 and 2 below, are polyethylene oxides terminated with phenol, octyl phenol, xylenol, betanaphthol, octyl alcohol, oleyl alcohol, dodecyl mercaptan, and xylyl mercaptan. Representative examples of the other classes listed above are polyesters of ethylene glycol and maleic or succinic acid, polyesters of tetramethylene glycol and phthalic acid, sorbitan monolaurate, monopalmitate, and monooleate, and polyethylene oxides in which one of the above polyesters or sorbitan esters is used as the terminating group.

Ionic dispersing agents which are active and stable in acid solution may also be used. Examples are the sulfate and sulfonate types, such as the sulfate esters of octyl, lauryl and stearyl alcohols and alkyl naphthalene sulfonates.

The dispersing agent should be stable to acid hydrolysis. The proportion of dispersing agent is ordinarily between 5 and 15% by weight of the hydrocarbon or chlorohydrocarbon. Either the hydrocarbon or the cuprous chloride solution may be the external phase. The advantages of the invention are not had unless a dispersion is formed during the passage of the gas. On the other hand, it is convenient to have the catalyst separable into its two phases, either on standing or on centrifuging, in order to remove the non-aqueous phase for removal of non-volatile, tarry accumulations.

The hydrocarbon or chlorohydrocarbon may be present dispersed in the aqueous phase of the catalyst or it may be the continuous phase with the aqueous phase dispersed therein. The former is preferred.

The reaction of monovinylacetylene with hydrogen chloride may be carried out in the two-phased catalyst as described, at 30 to 60° C. and preferably between 40 and 50° and preferably at a gauge pressure between 0 and 8 lbs. per sq. in. The molar ratio of monovinylacetylene to hydrogen chloride in the feed should be greater than one and preferably between about 4 and about 10.

Representative examples illustrating the present invention follow.

Example 1

The catalyst was based on a solution of 23 parts by weight of cuprous chloride and 17 parts by weight of hydrogen chloride in 60 parts of water. Two hundred milliliters of this was placed with 20 ml. of kerosene containing 1 ml. of a polyester of ethylene glycol and phthalic acid as a dispersing agent, in a vertical glass tube maintained at 46° C. A gas stream of 388 ml. of monovinylacetylene vapor and 77.6 ml. of hydrogen chloride per minute (1.0 mol and 0.2 mol, respectively, per hour) was introduced at the bottom of the catalyst column. The agitation by the gas stream emulsified the aqueous phase in the oil phase. The vapor stream from the top of the column was passed through a condenser cooled to 0° C. which condensed all of the chloroprene and 1,3-dichlorobutene-2 and part of the unreacted monovinylacetylene. The combined condensates from two runs contained 34.4 g. (0.423 mol) of chloroprene and 0.747 g. (0.006 mol) of dichlorobutene. The yield of chloroprene based on the total mols of chloro-compounds formed, was thus 98.6%. When the kerosene was omitted from the catalyst, the yield, calculated as above was 96.4%. The rate of production of chloroprene was somewhat less than with kerosene present.

Similar results were obtained using 5, 20 and 40% of kerosene by volume, based on the volume of aqueous catalyst.

*Example 2*

The catalyst was like that used in Example 1 except that the dispersing agent was one part, per 100 parts of total catalyst, of a polyethylene oxide, terminated with a long chain alkyl phenol. The reaction vessel containing the catalyst was a one-half gallon, wide mouth glass bottle lying on its side and closed by a stopper, through which passed a tube extending along the bottom of the reaction vessel and perforated so as to introduce the feed gas in fine bubbles into the catalyst at the lowest point, a second tube extending along the top to withdraw the gaseous reaction products, and a thermometer. The feed was about 270 g. (5 mols) of monovinylacetylene and about 26 g. (0.7 mol) of hydrogen chloride per hour. The hydrogen chloride was converted practically quantitatively to 56 g. of chloroprene and 7 g. of dichlorobutene per hour, the yield of chloroprene, based on the total mols of chloro-compounds formed, thus being 92%. Without kerosene in the catalyst, the yield was 88%.

*Example 3*

When the amount of hydrogen chloride in the feed in Example 2 was increased to 43 g. (1.18 mols) per hour, 87 g. of chloroprene and 11 g. of dichlorobutene were formed per hour. The yield was thus 90.3%. Thus even at this greater rate of production, the yield of chloroprene, based on the total of chloro-compounds formed, was greater than at the lower rate in the absence of kerosene.

We claim:

1. In the process of preparing 2-chlorobutadiene-1,3 wherein monovinylacetylene and hydrogen chloride, the molar ratio of monovinylacetylene to hydrogen chloride being greater than 1, are passed continuously through an aqueous cuprous chloride catalyst solution at a temperature within the range of 30 to 60° C., the improvement which comprises dispersing with said catalyst solution about 5 to 40% by volume, based on the total volume of catalyst, of a liquid having a boiling point of at least 100° C., said liquid being selected from the group consisting of non-viscous saturated hydrocarbons and non-viscous chlorinated saturated hydrocarbons, said dispersing being achieved in the presence of from 5 to 15% by weight of said saturated hydrocarbons of a dispersing agent stable to acid hydrolysis, and recovering the resulting 2-chlorobutadiene-1,3 from the effluent monovinylacetylene stream.

2. The process of claim 1 wherein about 8 to about 12% of said saturated hydrocarbon liquid is dispersed in said catalyst solution.

3. The process of claim 1 wherein the catalyst solution contains 23% cuprous chloride, 17% hydrogen chloride and 3% potassium chloride.

4. The process of claim 1 wherein the temperature of reaction is within the range of 40–50° C. and the molar ratio of monovinylacetylene to hydrogen chloride is within the range of 4:1 to 10:1.

References Cited in the file of this patent

UNITED STATES PATENTS

| | | |
|---|---|---|
| 2,027,550 | Perkins | Jan. 14, 1936 |
| 2,207,784 | Carter | July 16, 1940 |
| 2,221,941 | Carter et al. | Nov. 19, 1940 |